United States Patent
Shan et al.

(10) Patent No.: US 9,560,512 B2
(45) Date of Patent: *Jan. 31, 2017

(54) REPORTING OF USER PLANE CONGESTION (UPCON) USING A UPCON CONTAINER

(71) Applicant: INTEL IP CORPORATION, Santa Clara, CA (US)

(72) Inventors: Chang Hong Shan, Shanghai (CN); Muthaiah Venkatachalam, Beaverton, OR (US); Puneet K. Jain, Hillsboro, OR (US); Eric Siow, Beaverton, OR (US)

(73) Assignee: INTEL IP CORPORATION, Santa Clara, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/125,600

(22) PCT Filed: Sep. 27, 2013

(86) PCT No.: PCT/US2013/062183
§ 371 (c)(1),
(2) Date: Dec. 12, 2013

(87) PCT Pub. No.: WO2014/130092
PCT Pub. Date: Aug. 28, 2014

(65) Prior Publication Data
US 2015/0036496 A1    Feb. 5, 2015

Related U.S. Application Data

(60) Provisional application No. 61/768,330, filed on Feb. 22, 2013.

(51) Int. Cl.
*G01R 31/08*    (2006.01)
*G06F 11/00*    (2006.01)
(Continued)

(52) U.S. Cl.
CPC .......... *H04W 8/005* (2013.01); *H04L 12/4633* (2013.01); *H04L 27/2614* (2013.01);
(Continued)

(58) Field of Classification Search
CPC ................................................ H04W 28/0289
See application file for complete search history.

(56) References Cited

U.S. PATENT DOCUMENTS

2005/0103664 A1* 5/2005 Shih .............................. 206/378
2011/0103277 A1   5/2011 Watfa et al.
(Continued)

FOREIGN PATENT DOCUMENTS

CN          EP 2512176 A1 * 10/2012 ............ H04W 28/02
EP          2512176 A1 * 10/2012
(Continued)

OTHER PUBLICATIONS

NEC (Towards User Plane Congestion Management in lte eps, a Maeder et al., Slide 1-14, Mar. 2012).*
(Continued)

*Primary Examiner* — Maharishi Khirodhar
(74) *Attorney, Agent, or Firm* — Thorpe North & Western

(57) ABSTRACT

Technology for reporting radio access network (RAN) user plane congestion (UPCON) is disclosed. In an example, a core network (CN) device can include computer circuitry configured to: receive an UPCON event report using an UPCON container that includes a congestion situation indicator to indicate a UPCON situation; and change an UPCON process based on the congestion situation indicator. The core network device can include a mobility management entity (MME), a serving gateway (S-GW), a packet data network (PDN) gateway (P-GW), a policy and charging enforcement function (PCEF), a policy and charging rules function (PCEF), a serving general packet radio service (GPRS)

(Continued)

support node (SGSN), a gateway GPRS support node (GGSN), an access network discovery and selection function (ANDSF), an operation and maintenance (O&M) subsystem, an UPCON server, a proxy, or a standalone function entity.

16 Claims, 10 Drawing Sheets

(51) Int. Cl.

| | |
|---|---|
| H04J 1/16 | (2006.01) |
| H04W 8/00 | (2009.01) |
| H04W 72/04 | (2009.01) |
| H04W 74/02 | (2009.01) |
| H04W 76/02 | (2009.01) |
| H04W 72/00 | (2009.01) |
| H04W 76/04 | (2009.01) |
| H04L 12/46 | (2006.01) |
| H04W 4/00 | (2009.01) |
| H04L 29/12 | (2006.01) |
| H04W 28/02 | (2009.01) |
| H04W 40/02 | (2009.01) |
| H04W 48/18 | (2009.01) |
| H04W 24/06 | (2009.01) |
| H04W 74/00 | (2009.01) |
| H04W 74/04 | (2009.01) |
| H04W 74/08 | (2009.01) |
| H04W 36/00 | (2009.01) |
| H04W 36/30 | (2009.01) |
| H04L 27/26 | (2006.01) |
| H04W 40/24 | (2009.01) |
| H04W 24/02 | (2009.01) |
| H04W 88/06 | (2009.01) |
| H04L 12/725 | (2013.01) |
| H04W 28/08 | (2009.01) |

(52) U.S. Cl.
CPC ......... *H04L 61/2539* (2013.01); *H04W 4/005* (2013.01); *H04W 4/008* (2013.01); *H04W 24/02* (2013.01); *H04W 24/06* (2013.01); *H04W 28/02* (2013.01); *H04W 28/0289* (2013.01); *H04W 36/0088* (2013.01); *H04W 36/30* (2013.01); *H04W 40/02* (2013.01); *H04W 40/244* (2013.01); *H04W 48/18* (2013.01); *H04W 72/005* (2013.01); *H04W 72/0413* (2013.01); *H04W 72/0446* (2013.01); *H04W 74/002* (2013.01); *H04W 74/02* (2013.01); *H04W 74/04* (2013.01); *H04W 74/08* (2013.01); *H04W 76/023* (2013.01); *H04W 76/043* (2013.01); *H04L 45/30* (2013.01); *H04W 28/08* (2013.01); *H04W 88/06* (2013.01); *Y02B 60/50* (2013.01)

(56) References Cited

U.S. PATENT DOCUMENTS

| | | | |
|---|---|---|---|
| 2011/0158090 A1* | 6/2011 | Riley | H04L 12/14 370/230 |
| 2011/0170408 A1 | 7/2011 | Furbeck et al. | |
| 2011/0255410 A1 | 10/2011 | Yamen et al. | |
| 2011/0299395 A1* | 12/2011 | Mariblanca Nieves | H04L 12/5695 370/235 |
| 2012/0052866 A1 | 3/2012 | Froehlich et al. | |
| 2012/0082029 A1 | 4/2012 | Liao | |
| 2012/0100848 A1 | 4/2012 | Miklos | |
| 2012/0257499 A1* | 10/2012 | Chatterjee | H04W 28/0284 370/232 |
| 2013/0021933 A1 | 1/2013 | Kovvali et al. | |
| 2015/0103664 A1* | 4/2015 | Shan et al. | 370/235 |

FOREIGN PATENT DOCUMENTS

| | | |
|---|---|---|
| JP | 2007520901 | 7/2007 |
| WO | WO 2013/022470 A1 | 2/2013 |
| WO | WO 2014/015112 A2 | 1/2014 |

OTHER PUBLICATIONS

International Search Report and Written Opinion received for PCT Patent Application No. PCT/US2013/062183, mailed on Jan. 28, 2014, 12 pages.
3GPP TR 22.805; "Feasibility Study on User Plane Congestion Management", Technical Specification Group Services and System Aspects, Release 12, Dec. 18, 2012, pp. 1-35.
T-Mobile Orange, "S1-U TNL Congestion Indication", R3-080861, 3GPP TSG-RANWG3 Meeting # 59bis, Mar. 31-Apr. 3, 2008, 3 pages.
3GPP TR UPCON, "System Enhancements for User Plane Congestion Management", Technical Specification Group Services and System Aspects, V0.1.0, Release 12, Nov. 2012, pp. 1-9.
NEC, Analysis and discussion of UPCON solution elements (additional considerations), 3GPP SA WG2 Meeting #95 S2-130404, Jan. 22, 2013.
NEC, AT&T, Broadcom, InterDigital, Analysis and discussion of UPCON solution elements, 3GPP SA WG2 Meeting #95 S2-130402, Jan. 22, 2013.
NEC, NTT DOCOMO, KDDI, Intel, Ericsson, Qualcomm Incorporated, Cygnus Broadband, Allot Communications, Openet, Telcom Italia, China Mobile, Benu Networks, ZTE, RAN user plane congestion definition, 3GPP SA WG2 Meeting #95 S2-130681, Feb. 1, 2013.
Intel; S1-U Congestion Mitigation Solution; 3GPP Draft; SA WG2 Meeting #95; S2-130198; Jan. 28-Feb. 1, 2013; 14 pages.

* cited by examiner

REPORTING OF USER PLANE CONGESTION (UPCON) USING A UPCON CONTAINER

RELATED APPLICATIONS

The present application claims priority to U.S. Provisional Patent Application No. 61/768,330, filed Feb. 22, 2013, the entire specification of which is hereby incorporated by reference in its entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

A core network (CN), or network core, can be a central part of a telecommunication network that provides various services to users who are connected by the radio access network (RAN). One of the functions of core network can be to route a packet from the RAN to the Internet.

The core network can provide high capacity communication facilities that connect primary nodes. Core network (or backbone network) can provide paths for the exchange of information between different sub-networks. For enterprise private networks serving one organization, the high capacity communication facilities can be referred to as the backbone, while for service providers, the high capacity communication facilities can be referred to as the core network.

Telecommunications network can include three parts, or planes: the control plane, the user plane (data plane or bearer plane), and the management plane. The three parts can be referred to as planes because each part can be separate overlay networks. The control plane can carry control information (also known as signaling). The user plane can carry the network's users traffic. The management plane can carry the operations and administration traffic used for network management.

In the 3GPP LTE wireless communication standard, a system architecture evolution (SAE) can use a core network architecture. The SAE can have a flat, all-Internet protocol (all-IP) architecture with separation of control plane and user plane traffic. A main component of the SAE architecture can be the evolved packet core (EPC), or SAE core.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
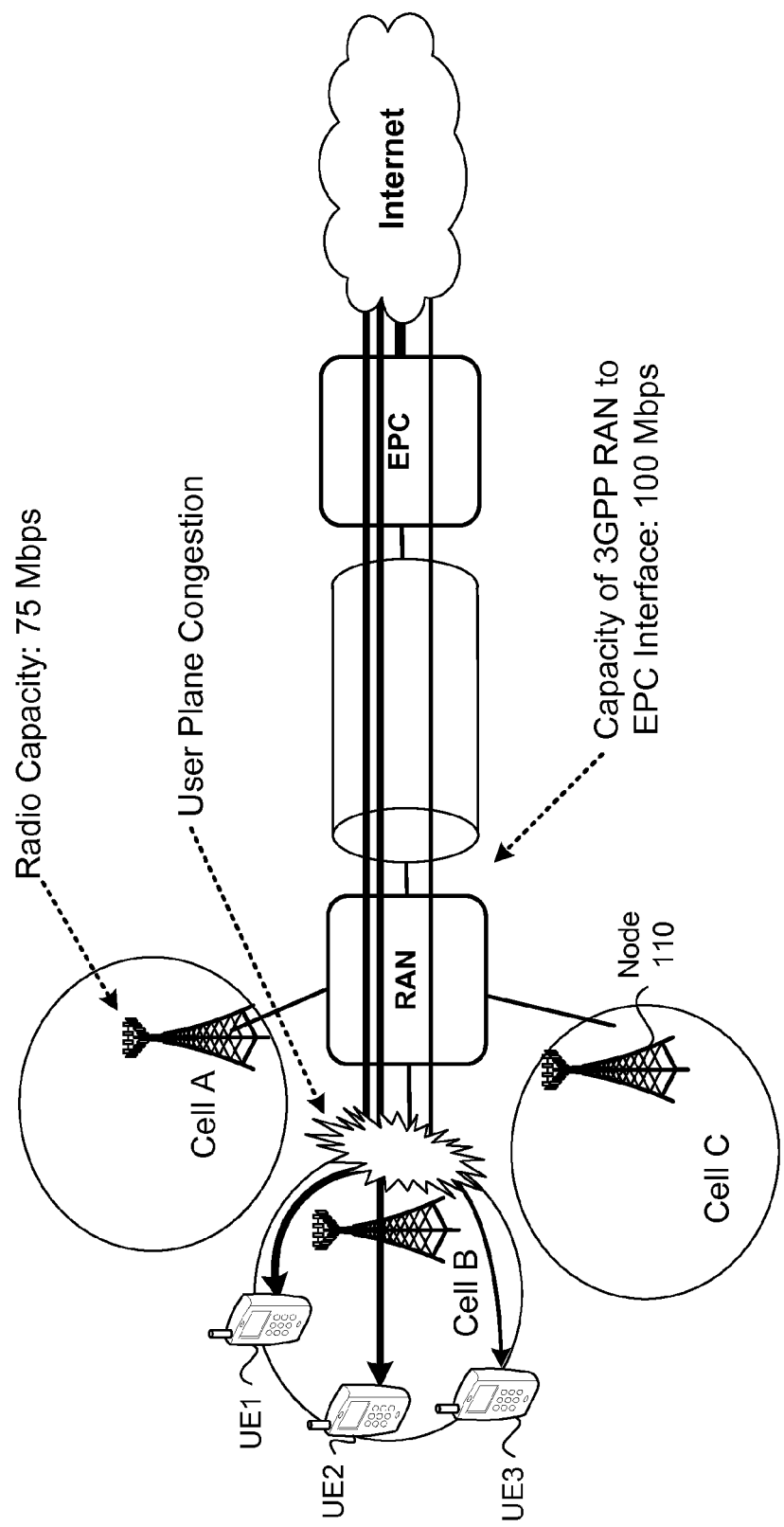
FIG. 1 illustrates user plane congestion (UPCON) due to a third generation partnership project (3GPP) radio access network (RAN) to evolved packet core (EPC) radio interface (e.g., LTE-Uu, Uu) capacity limitation.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The user plane protocol stack between the access point or node (eNB) and UE can include the packet data convergence protocol (PDCP), radio link control (RLC), medium access control (MAC) sub-layers. On the user plane, packets in the core network (e.g., EPC) can be encapsulated in a specific EPC protocol and tunneled between a packet data network (PDN) gateway (PGW or P-GW) and the node (e.g., eNB). Different tunneling protocols can be used depending on the interface. General packet radio service (GPRS) tunneling protocol (GTP) can be used on an S1 interface between the eNB and serving gateway (SGW or S-GW) and on an S5 and/or S8 interface between the SGW and PGW. Packets received by a layer can be called service data unit (SDU) while a packet output of a layer can be referred to by protocol data unit (PDU) and Internet protocol (IP) packets at user plane flow from top to bottom layers.

The control plane can include the addition of the radio resource control layer (RRC), which can be responsible for configuring the lower layers (e.g., physical layer). The control plane can handle radio-specific or connection-specific functionality which can depend on the state of the UE which can include two states: idle or connected.

In recent years, mobile operators have seen significant increases in user traffic data. Although the data capacity of networks has increased, the observed increase in user traffic data continues to outpace the growth of network data capacity. In general, radio access network (RAN) user plane congestion (UPCON) may occur when the demand for RAN resources (i.e., for the transfer of user data) exceeds the capacity of the RAN resources. As a result, users may receive the data with a reduced quality of service (QoS). Thus, the increase of network congestion may degrade the user service experience. In general, user plane congestion (i.e., data plane congestion), or UPCON, may be triggered under two scenarios: (1) User plane congestion due to full use of cell capacity (e.g., radio interface or air interface); and (2) User plane congestion due to limitations of the 3GPP RAN to an evolved packet core (EPC) interface (e.g., network interface). Quality of service (QoS) can refer to several related aspects of telephony and computer networks that allow the transport of traffic with special requirements.

FIG. 1 illustrates an example of user plane congestion (UPCON) on a radio interface (e.g., LTE-Uu, Uu) due to full use of cell capacity. The third generation partnership project (3GPP) radio access network (RAN) node 110 may be in communication with a core network (e.g., an evolved packet core (EPC)). The EPC may be included in the core network (CN). In an example, the capacity of the 3GPP RAN to EPC interface (e.g., Gb, Iu-Ps, S1-U) may be 100 megabits per second (Mbps). The 3GPP RAN node may communicate user data to a plurality of user devices or user equipments (UES) located within a cell. UPCON may occur when the traffic volume in Cell B exceeds the capacity of the cell. For example, the plurality of UEs in the cell may generate user plane traffic that equals the cell capacity. When an additional or an existing UE attempts to generate additional user plane traffic in the cell, congestion may occur in that cell. As an example, the 3GPP RAN may communicate user data to Cells A, B, and C. The radio capacity (e.g., radio interface) may be 75 Mbps for Cells A, B, and C. UPCON may occur when the traffic volume in Cell B exceeds the capacity of the cell (e.g., 75 Mbps). In another example. UPCON can occur when traffic volume exceeds a specified percentage of the capacity of the cell or interface.

Figure 2:
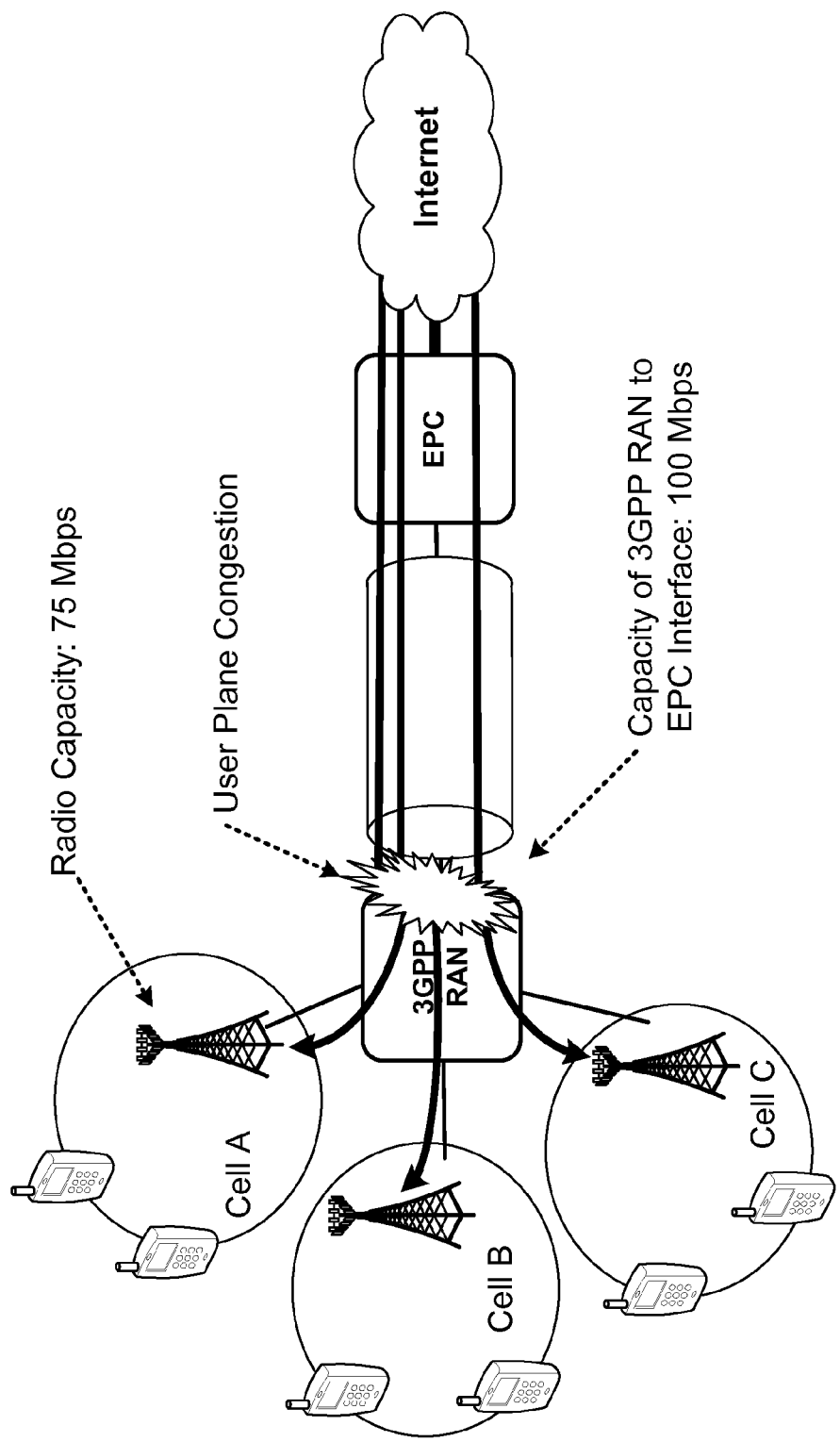
FIG. 2 illustrates user plane congestion (UPCON) due to a third generation partnership project (3GPP) radio access network (RAN) to evolved packet core (EPC) network interface (e.g., Gb, In-PS, S1-U) capacity limitation.

FIG. 2 illustrates an example of UPCON due to a capacity limitation of a 3GPP RAN to evolved packet core (EPC) interface or network interface Gb, Iu-Ps, S1-U). The 3GPP RAN may be in communication with the EPC. In an example, the capacity of the 3GPP RAN to EPC interface may be 100 Mbps. The 3GPP RAN may communicate user data to Cells A, B and C, wherein each of the cells may contain a plurality of user devices or UEs. The radio capacity for each cell may be 75 Mbps. When the volume of the user plane data communicated to the plurality of UEs in Cells A, B, and C is greater than the capacity of the 3GPP RAN to EPC interface. UPCON may occur at the 3GPP RAN. For example, the volume of the user plane data may be greater than the capacity of the 3GPP RAN to EPC interface (e.g., 100 Mbps). As a result, all of the UEs in Cells A, B, and C may experience excessive data rate reduction or service denial. Even though each cell (e.g., Cells A, B, and C) may have the necessary capacity to support the plurality of UEs being served within that cell, the capacity limitations of the 3GPP RAN to EPC interface may adversely impact one or more UEs in Cells A, B, and C. As a result, the UPCON at the 3GPP RAN to EPC interface may prevent the plurality of UEs from sending user data to or receiving user data from the EPC.

Mechanisms can be used for the packet data network gateway (PDN-GW) to avoid and handle cell overload situations. For example, the PDN-GW may reject packet data network (PDN) connection setup requests from the UEs that arrive at the PDN gateway (P-GW) via the mobility management entity (MME). The UEs may then be notified that a new PDN connection cannot be established with the network. However, the PDN connection setup requests may still be sent to a presumably overloaded P-GW. Furthermore, a higher latency for the UEs to be notified that the PDN connections cannot be established via the P-GW may exist because the PDN connection setup requests travel from an evolved node B (eNB) through the MME to the P-GW, and then back through the MME and the eNB before reaching the UEs. In addition, an overload situation in the serving gateway (S-GW) may also impact UE throughput, thereby resulting in a negative user experience.

Thus, in order to mitigate the effect of UPCON, the core network (CN) may provision UPCON detection rules to the access network (e.g., the RAN). The UPCON detection inks may include UPCON event triggers. As a result, the access network may detect UPCON conditions based on the UPCON event triggers that are provisioned by the CN. The access network may report congestion conditions to the CN. The CN may notify an application server (AS) to perform one or more actions that reduce the congestion on the user plane (i.e., data plane).

The core network (CN) may communicate policy and control charging (PCC) information related to user plane congestion (i.e., UPCON related PCC information) to the RAN. The CN may provision the UPCON related PCC information to the RAN in order to deal with UPCON situations more effectively. In other words, the CN may deliver or provide the UPCON related PCC information to the RAN. In particular, the UPCON related PCC information may be delivered to a RAN node, an evolved node B (eNB), a radio network controller (RNC), or a base station system (BSS).

The UPCON related PCC information may include an UPCON event, such as an indication of RAN user plane congestion. In addition, the UPCON event may include an indication that a RAN user plane congestion reporting feature has been enabled or started for a portion (or all) of the evolved packet system (EPS) bearers of the UE. The UPCON related PCC information may include one or more UPCON event triggers. The UPCON event trigger may indicate that the location of the UPCON occurs at one of: a radio uplink, a radio downlink, a network uplink, a network downlink, or a RAN node processing capability.

The technology (e.g., core network device, nodes, application server (AS), methods, computer circuitry, systems, structures, and mechanism) as described herein can provide RAN user plane congestion (UPCON) awareness to notify a CN once the RAN user plane is congested and notify the CN when change and/or cancellation of congestion situation once the RAN user plane congestion situation is changed or ceases (i.e., disappears).

In case that the RAN (e.g., 3GPP RAN) user plane is uncongested after a period of congestion, the RAN can notify the CN of the change and/or cancellation of congestion situation in order that related core network elements (e.g. a policy and charging rules function (PCRF), a mobility management entity (MME), SGW, PGW, an access network discovery and selection function (ANDSF) server, an operation and maintenance (O&M) server, or an UPCON server) may return to normal functionality or behave properly.

Figure 3:
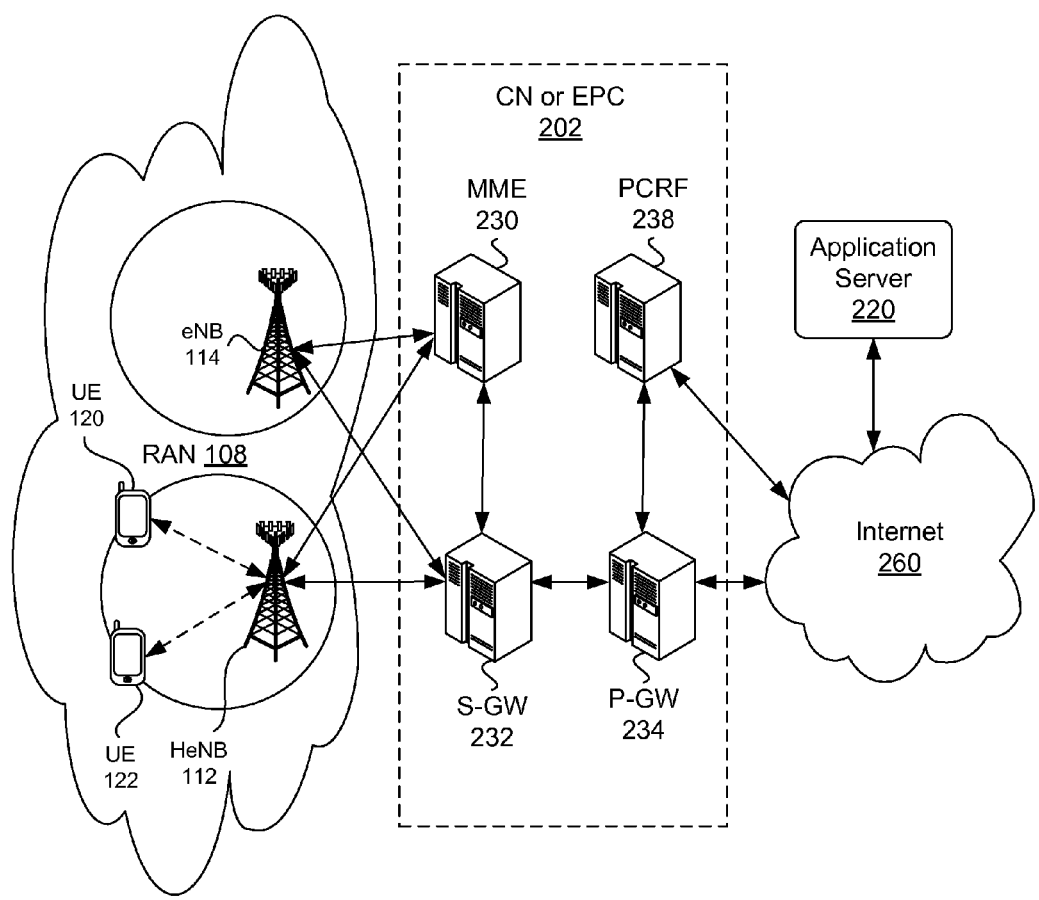
FIG. 3 illustrates a diagram of communication in radio access network (RAN) with a core network (CN) or an evolved packet core (EPC) in accordance with an example.

FIG. 3 illustrates a 3GPP LTE RAN 108 and a core network (CN) or evolved packet core (EPC) 202. For example, the RAN can include nodes (e.g., eNB 114 and home eNB (HeNB) 112) in a universal terrestrial radio access network (UTRAN) or an evolved UTRAN (E-UTRAN or eUTRAN). The UEs 120 and 122 can be in wireless communication with the eNB (e.g., HeNB 112). The RAN can be coupled to the Internet 260 via as core network (CN) (e.g., EPC). The CN or Internet can be coupled to an application server 220. The application server can provide various applications and services. The EPC can include serving gateway (S-GW) 232 and a mobility management entity (MME) 230 coupled to the RAN, and a packet data network (PDN) gateway (P-GW) 334 to couple the S-GW to a PDN, such as the Internet 260, an intra-net, or other similar network. The S-GW can provide network access for the UEs associated with the RAN. The core network can include a policy and charging rules function (PCRF) coupled to the P-GW. The core network can also include an access network discovery and selection function (ANDSF) server (not shown), an operation and maintenance (O&M) server (not shown), or an UPCON server (not shown). Core network devices can be in direct communication with each other via cabling, wire, optical fiber, and/or transmission hardware, such a router or repeater.

The serving gateway (S-GW or SCANT) 232 can route and forward user data packets, while acting as a mobility anchor for a user plane during inter-eNodeB handovers and as an anchor for mobility between LTE and other 3GPP technologies (terminating S4 interface and relaying the traffic between 2G/3G systems and the PGW). For idle state UEs, the S-GW can terminate the downlink data path and triggers paging when downlink data arrives for the UE. The S-GW can manage and store UE contexts, parameters of the IP bearer service, and network internal routing information. The S-GW can perform replication of the user traffic in case of lawful interception.

The SGW protocol stack can include a S11 control plane stack to support S11 interface with the MME 230, a S5/S8 control and data plane stacks to support S5/S8 interface with the PGW 234, a S1 data plane stack to support S1 user plane interface with eNodeB 112 and 114 (210 FIG. 4), a S4 data plane stack to support S4 user plane interface between a radio network controller (RNC) of universal mobile telecommunications system (UMTS) and SGW of eNodeB. The SGW can support a S11 interface with the S5/S8 and S5/S8 interface with PGW. The integrated control plane stack for these SGW interfaces can include the IP, an user datagram protocol (UDP), or an enhanced GPRS tunneling protocol control (eGTP-C). The SGW can support the S1-user (S1-U) interface with the eNodeB and S5/S8 data plane interface with the PGW. The integrated data plane stack for these SGW interfaces can include the IP, the UDP, or an enhanced GPRS tunneling protocol user (eGTP-U).

An interface can be used when a radio access bearer is established between the wireless device (e.g., UE) and an edge of the 3GPP core network (e.g., gateway general packet radio service (GPRS) support node (GGSN) or packet data network (PDN) gateway (P-GW) 234). The gateway GPRS support node (GGSN) can be a network node that acts as a gateway between a GPRS wireless data network and other networks. The GGSN can store subscriber data received from a home location register (HLR) and/or a serving GPRS support node (SGSN), as well as an address of the SGSN where each wireless device is registered. The PDN gateway (P-GW or PGW) can provide connectivity from the wireless device to external packet data networks by being the point of exit and entry of traffic for the wireless device. A wireless device can have simultaneous connectivity with more than one P-GW for accessing multiple PDNs. The P-GW can perform policy enforcement packet filtering for each user, charging support, lawful interception and packet screening. The P-GW can act as the anchor for mobility between 3GPP and non-3GPP technologies such as WiMAX and 3GPP2.

The PGW protocol stack can include the S5/S8 control and data plane stacks to support S5/S8 interface with SGW 232. The PGW 234 can support the S5/S8 interface with the SGW. The integrated control plane stack for the S5/S8 interfaces can include IP, UDP, or eGTP-C. The integrated data plane stack for the S5/S8 interface can include IP, UDP, or eGTP-U.

The MME 230 can be used to handle the mobility related signaling functionality. In LTE, the MME can be a control node to the RAN. The MME can provide for mobile device idle mode tracking and paging, data retransmissions to the mobile device, mobile device authenticating, inter-core network handover tracking of the mobile device, or combinations of these functions. The MME can be involved in a bearer activation/deactivation process and in choosing the S-GW for the mobile device at the initial attachment and during core network (CN) node relocation. The MIME can generate and allocate temporary identities to the mobile devices. The MME can enforce mobile device roaming restrictions. The MME can handle the security key management and lawful interception signaling.

The MME protocol stack can include a S1-MME stack to support S1-MME interface with the eNodeB, and a S11 stack to support S11 interface with the S-GW. The MME 230 can support the S1 interface with eNodeB. The intergrated S1 MME interface stack can include an Internet protocol (IP), a stream control transmission protocol (SCTP), or an S1 application part (S1AP).

The policy and charging rules function (PCRF) 238 can control the charging and the establishment of resources in the RAN and a packet-switched (PS) core network 202. The PCRF and a policy and charging enforcement function (PCEF) can be closely related functional entities, which can include policy control decision making and flow based charging control functionalities. The PCRF can be designed to provide network control relating to the service data flow detection, quality of service (QoS), and flow based charging controlling to the PCEF. Whereas PCEF can provide user traffic handling and QoS at the gateway. The PCRF can also be responsible the providing service data flow detection, counting along with online and offline charging interactions. The PCRF can be a dedicated policy functional entity that is standardized in 3GPP and provides policy functions for bandwidth and charging on multimedia networks. The PCRF function can act as a part of a policy charging control (PCC) architecture, which also include the PCEF and a proxy call session control function (P-CSCF). The PCRF can aggregate information inside the hosting network. Therefore. PCRF can be considered as a part of an entire network architecture. The PCRF can make intelligent policy decisions for each subscriber active in the network automatically. Operational support systems (OSS) along with other sources (e.g., portals) in real time support the creation of rules which can help policy making. With the PCRF the network can offer multiple services, charging rules, and quality of service (QoS) levels. The PCRF can operate according to the received session and media related information through an application fraction (AF). Then this session and media related information can be transferred to the AF of traffic planning events. The PCRF can be the entity which applies PCC rules to the PCEF using the gateway interface. Most of the subscriber information databases and other specialized functions can be accessible to PCRF. Information related to charging systems can also be accessible to PCRF in a more scalable and centralized manner. The PCRF can provide real-time policy and charging rules operation.

Figure 4:
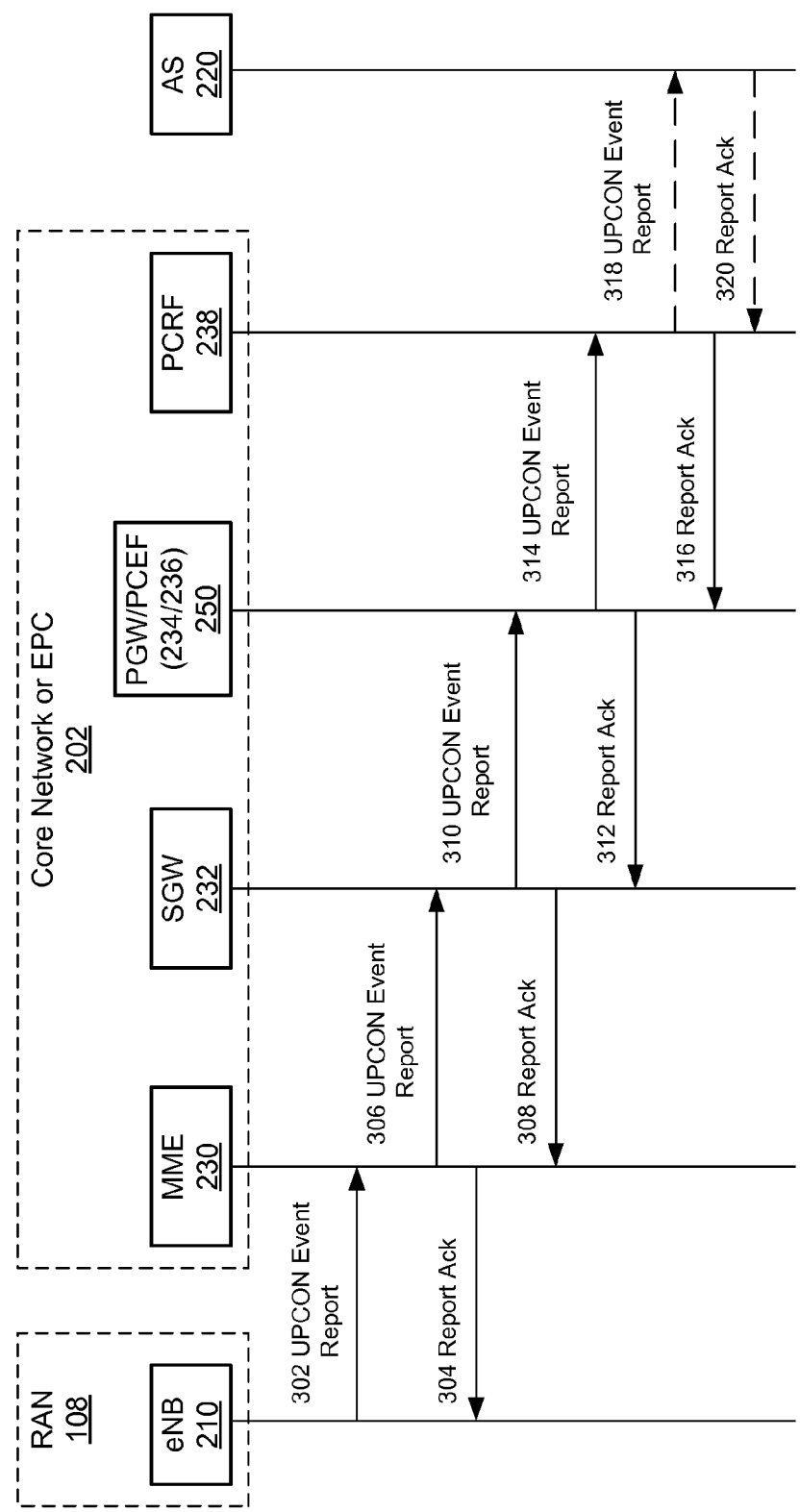
FIG. 4 illustrates the communication of an user plane congestion (UPCON) event report using various interfaces in accordance with an example.

A policy and charging enforcement function (PCEF) 234 can be a functional entity which includes policy enforcement along with follow based charging functionalities, as illustrated in FIG. 4. The PCEF functional element can be located at the gateway (e.g., PGW 250). The PCEF can be responsible for providing controller functions in traffic handling and QoS at the gateway over the user plane, and providing service data flow detection, counting with including online and offline different charging interactions. The PCEF may select an appropriate PCC rule for the evaluation process of each received packet against the service data flow filters of PCC rules. The selection of the appropriate PCC title can be performed by considering the order of precedence for each PCC title. Once a packet is matched with a service data flow filter, the PCC rule of a service data flow filter can be considered as the packet matching process of that particular packet. Therefore, the PCC rule for that filter can be applied. The PCEF can play a role when considering a certain service data flow, which can be controlled by the policy control. The service data flow can be allowed to pass through the gateway by the PCEF, when a corresponding gate is accessible.

Both the PCEF 236 and the PCRF 238 can be functional entities involved in different levels of charging policing implementation. Both the PCEF and the PCRF can use PCC rules. The PCRF can include policy control decision and flow based charging control functions whereas, the PCEF can focus on policy enforcement and follow based charging functions. When considering predefined PCC rules, the PCC rules can be preconfigured by the PCEF, but the activation or the deactivation of these predefined PCC rules may be performed by PCRF. The PCEF can support online and offline charging interactions whereas PCRF may not.

Figure 7:
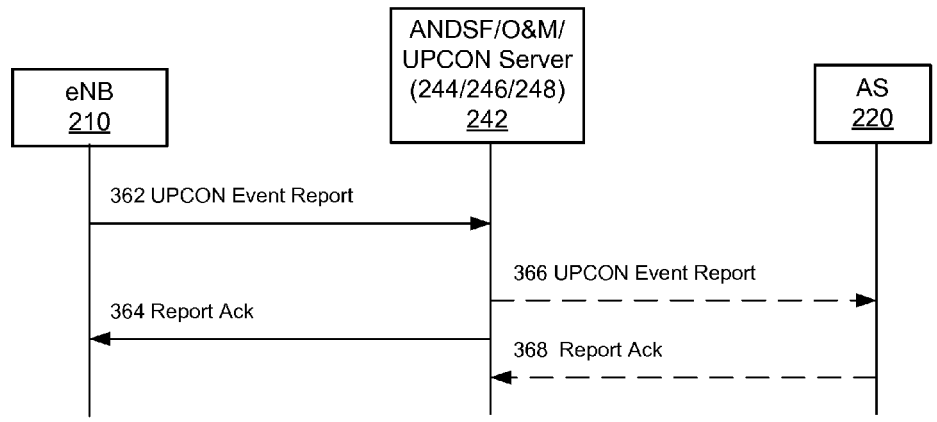
FIG. 7 illustrates user plane congestion (UPCON) event reporting to a server (e.g., an access network discovery and selection function (ANDSF), an operation and maintenance (O&M) subsystem or an UPCON server) without a proxy in accordance with an example.

The access network discovery and selection function (ANDSF) 244 can assist the user equipment (UE) to discover non-3GPP access networks, such as Wi-Fi or WIMAX, that can be used for data communications in addition to 3GPP access networks (such as high speed packet access (HSPA) or LTE) and to provide the UE with rules policing the connection to these networks, as illustrated by FIG. 7. The ANDSF can provide information to the UE about connectivity to 3GPP and non-3GPP access networks. The ANDSF can assist the UE to discover the access networks in their vicinity and to provide rules (i.e., policies) to prioritize and manage connections to these networks.

The operation and maintenance (O&M) 246 subsystem or server can support the management of centralized remote applications, with planning, measurements, and optimization processes, using computer-aided tools. The self-organizing networks (SON) paradigm can automate the O&M functions with localized, distributed, centralized and hybrid architectures. These automated O&M functions can be designed for a self-organizing behavior, reacting dynamically with the variation of network parameters and performance indicators, and optimizing the overall performance and quality.

The UPCON server 248 can be a server dedicated to managing UPCON. The UPCON server may also provide other core network functionality. An application server (AS) 220 can be a software framework that provides a generalized approach to creating an application-server implementation without regard to what the application functions are, or AS can include a server portion of a specific implementation instance. In either case, the server's function can be dedicated to the efficient execution of procedures (e.g., programs, routines, scripts) for supporting its applied applications.

Referring back to FIG. 4, the RAN 108 (e.g., via an eNB 210) can notify the CN 202 (e.g., EPC) of the change and/or cancellation of congestion situation, then the related core network elements (e.g. PCRF 238, MME 230, SGW 232, PGW 234, ANDSF server 244 (FIGS. 7-8), O&M server 246 (FIGS. 7-8), or UPCON server 248 (FIGS. 7-8)) can take the proper actions (e.g., apply UPCON PCC rules or cancel PCC rules applicable to UPCON). The RAN can notify the CN of an user plane congestion (UPCON) event or situation by generating an UPCON event report and sending or transmitting the UPCON event report 302 to the CN (e.g., MME), and the CN can acknowledge or report acknowledgement (ACK) 304 proper receipt of the UPCON event report. Each CN device can transmit or forward the UPCON event report 306, 310, or 314 to another CN device and receive a report ACK 308, 312, or 316 from the other CN device.

For instance, the MME 230 can receive the UPCON event report 302 from the eNB 210 and report ACK 304 to the eNB via the S1-MME interface, and forward the UPCON event report 306 to the SGW 232 via the S11 interface. The SGW can report ACK 308 to the MME via the S11 interface and forward the UPCON event report 310 to the PGW/PCEF 250 via the S5/S8 interface. The PGW/PCEF can report ACK 312 to the SGW via the S5/S8 interface and forward the UPCON event report 314 to the PCRF 238 via the Gx interface, and the PCRF can report ACK 316 to the PGW/

PCEF via the Gx interface. In an example, the PCRF can forward the UPCON event report 318 to the application server (AS) 220 and receive the report ACK 320 from the AS via the Rx interface.

An UPCON event report can include a UPCON container. The UPCON container can be used to address a change or cancellation of a RAN user plane congestion situation. The UPCON container can include a congested interface indicator, a severity level indicator, a congestion situation indicator, or an identifier (ID) or a name corresponding to a UPCON location. The congested interface indicator can indicate a congestion interface, such as a radio interface (e.g., LTE-Uu, Uu) or a network interface (e.g., Gb, Iu-PS, S1-U). A severity level indicator can provide a predefined number indicating the severity level. For example, the severity level can be a range of values (e.g., 0 to 7), where the smaller number represents a severer (or worse) UPCON condition while a larger number represent less UPCON. In another example, a larger number represents a severer (or worse) UPCON condition while a smaller number represent less UPCON. Different PCC rules can be applied based on the congestion severity level. In an example, the congestion severity level can be represented by a multiple bits (e.g., 4 bits).

A congestion situation indicator can indicate whether congestion exists (e.g., a 0-bit can mean congestion disappears and a 1-bit mean congestion appears, or alternatively, a 1-bit can indicate that UPCON exists and a 0-bit can indicate that UPCON ceases or terminates). In an example, the congestion situation indicator can be represented by a single bit. The congestion situation indicator can provide a binary or discrete value for a UPCON situation or event.

In another example, when the congestion severity level is used, the congestion situation indicator may not be needed. The RAN devices (e.g., eNB) or the CN devices may determine the congestion situation indicator based on a threshold of the congestion severity level.

For a cell based UPCON situation notification, a cell identifier (CID) can be included in the UPCON container. For a LTE based UPCON situation notification, the identifier (ID) can include identify a UE, which can be included in the UPCON container. For an access point name (APN) based UPCON situation notification, the APN can be included in the UPCON container. For packet data protocol (PDP) context and/or evolved packet system (EPS) bearer based UPCON situation notification, a relative ID can be included in the UPCON container.

Figure 5:
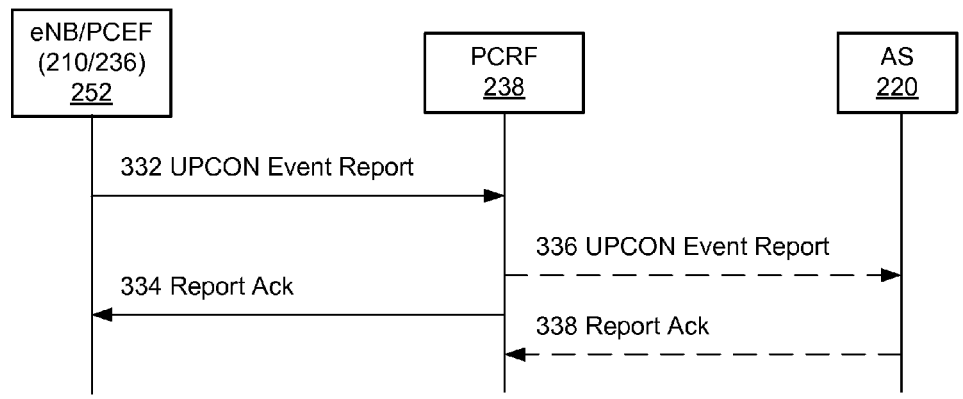
FIG. 5 illustrates direct user plane congestion (UPCON) event reporting to a policy and charging rules function (PCRF) in accordance with an example.

Various processes and procedures can be used for the RAN to report the UPCON events to the CN. The AS of FIGS. 4-6 can include the ANDSF server, the O&M server, or the UPCON server which can collect the RAN user plane congestion situation. FIG. 5 illustrates UPCON event reporting directly to the PCRF 238 or the AS 220 from the eNB/PCEF 252. The eNB/PCEF can forward the UPCON event report 332 to the PCRF and receive the report ACK 334 from the PCRF. In an example, the PCRF can forward the UPCON event report 336 to the AS and receive the report ACK 338 from the AS.

Figure 6:
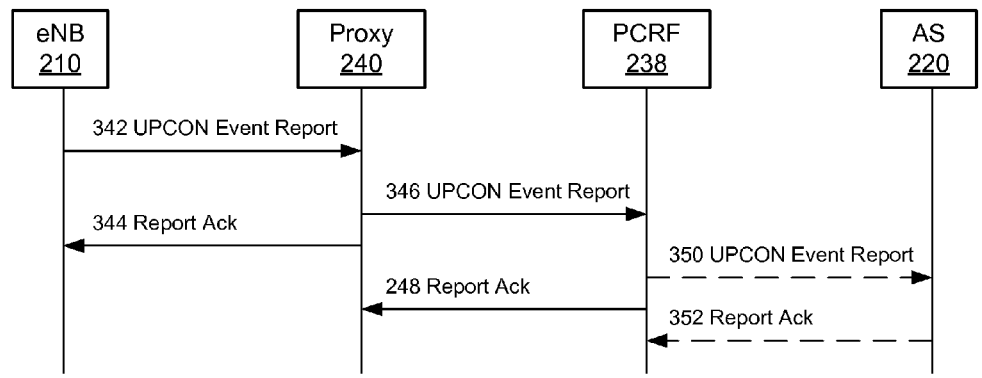
FIG. 6 illustrates user plane congestion (UPCON) event reporting to a policy and charging rules function (PCRF) via a proxy or agent in accordance with an example.

FIG. 6 illustrates UPCON event reporting to the PCRF 238 via a proxy 240 and/or agent. The proxy can be standalone function entity (FE) or collocated with the MME 230, the SGW 232, or the PGW 234 (SGSN or GGSN in case of second-generation (2G) or third-generation (3G) wireless telephone technology) and other network element. The proxy can be a multi-hop entity, which can represent multiple network elements between the eNB and the ANDSF, O&M, and/or UPCON server. When the proxy is located in the SGW, the UPCON container can be transferred to the SGW via other network elements such as the MME (SGSN in case of 2G and 3G). When the proxy is located in the PGW, the UPCON container can be transferred to PGW via the MIME and the SGW (SGSN and SGW in case of 2G and 3G. In an example, the eNB can forward the UPCON event report 342 to the proxy and receive the report ACK 344 from the proxy. The proxy can forward the UPCON event report 346 to the PCRF and receive the report ACK 348 from the PCRF. In another example, the PCRF can forward the UPCON event report 350 to the AS and receive the report ACK 352 from the AS.

FIG. 7 illustrates UPCON event reporting to a server 242 (e.g., the ANDSF 244, O&M 246, and/or UPCON 248 server) without a proxy and/or agent. The eNB 210 can forward the UPCON event report 362 to the server and receive the report ACK 364 from the server. In an example, the server can forward the UPCON event report 366 to the AS and receive the report ACK 368 from the AS.

Figure 8:
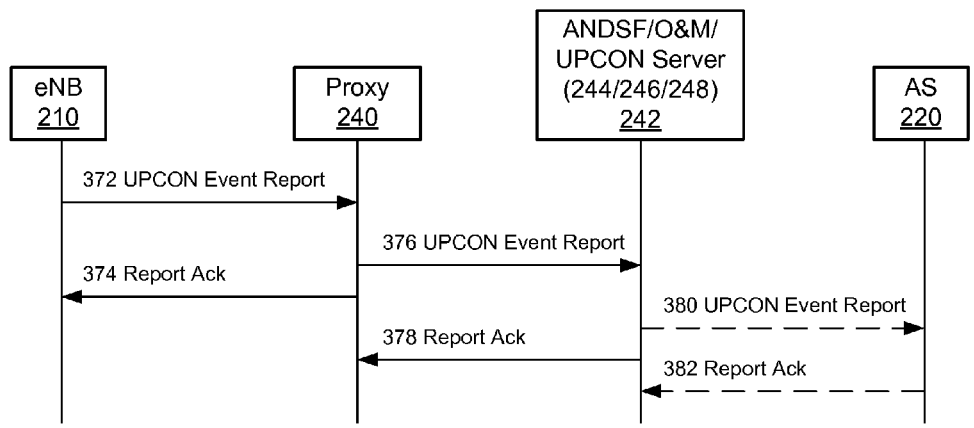
FIG. 8 illustrates user plane congestion (UPCON) event reporting to a server (e.g., an access network discovery and selection function (ANDSF), an operation and maintenance (O&M) subsystem, or an UPCON server) with a proxy in accordance with an example.

FIG. 8 illustrates UPCON event reporting to a server 242 (e.g., the ANDSF 244, O&M 246, and/or UPCON 248 server) with a proxy 240 and/or agent. In an example, the eNB 210 can forward the UPCON event report 372 to the proxy and receive the report ACK 374 from the proxy. The proxy can forward the UPCON event report 376 to the server and receive the report ACK 378 from the server. In an example, the server can forward the UPCON event report 380 to the AS and receive the report ACK 382 from the AS.

Figure 9:
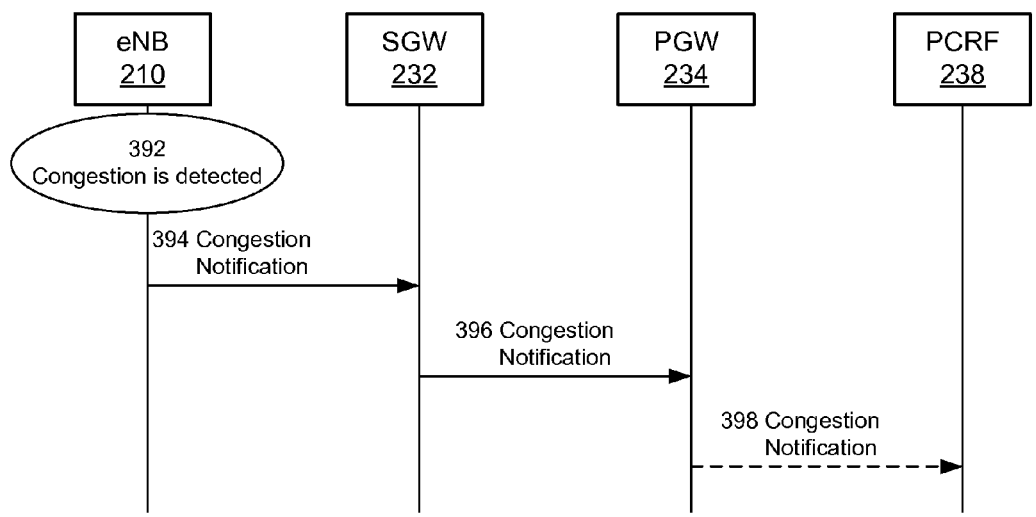
FIG. 9 illustrates congestion notification to a policy and charging rules function (PCRF) via GTP-U in accordance with an example.

FIG. 9 illustrates congestion notification from the eNB 210 to the PCRF 238 via GTP-U interface. UPCON container can be included in congestion notification via the user plane by extending a GTP-U header. The GTP-U header can include the UPCON container or components (e.g., indicators) of the UPCON container. In an example, the eNB can detect UPCON 392 and forward the congestion notification 394 to the SGW 232. The SGW can forward the congestion notification 396 to the PGW 234, and the PGW can forward the congestion notification 398 to the PCRF. In another example, the FIGS. 5-8 can be adapted for the congestion notification (without a report ACK).

Various actions can be taken by the CN or CN device when the UPCON event report or congestion notification is received. For instance, when the PCRF receives the UPCON event report or congestion notification, the PCRF may initiate an Internet protocol (IP) connectivity access network (IP-CAN) session modification procedure to accommodate PCC rules for the UPCON situation. When the server (e.g., ANDSF, O&M, and/or UPCON server) receives the UPCON event report or congestion notification, the server may trigger the UE or the AS to enable a related provisioned rule or initiate a relative rule provision or modification procedure to the UE or the AS. When the MME receives the UPCON event report or congestion notification, the MME may trigger the IP-CAN session modification procedure to accommodate the changed UPCON condition. When the SGSN receives the UPCON event report or congestion notification, the SGSN may trigger the PDP context and/or IP-CAN session modification procedure to accommodate the changed UPCON condition. When the P-GW receives the UPCON event report or congestion notification, the P-GW may trigger the P-CAN session modification procedure to accommodate the changed UPCON condition. When the GGSN receives the UPCON event report or congestion notification, the GGSN may trigger the PDP context modification procedure to accommodate the changed UPCON condition.

If the UPCON event report or congestion notification indicates S1-U congestion, the S-GW may modify the QoS mapping on S1-U and handle the UPCON event internally. In another example, the S-GW may also trigger IP-CAN session modification procedure to accommodate the changed UPCON condition.

Figure 10:
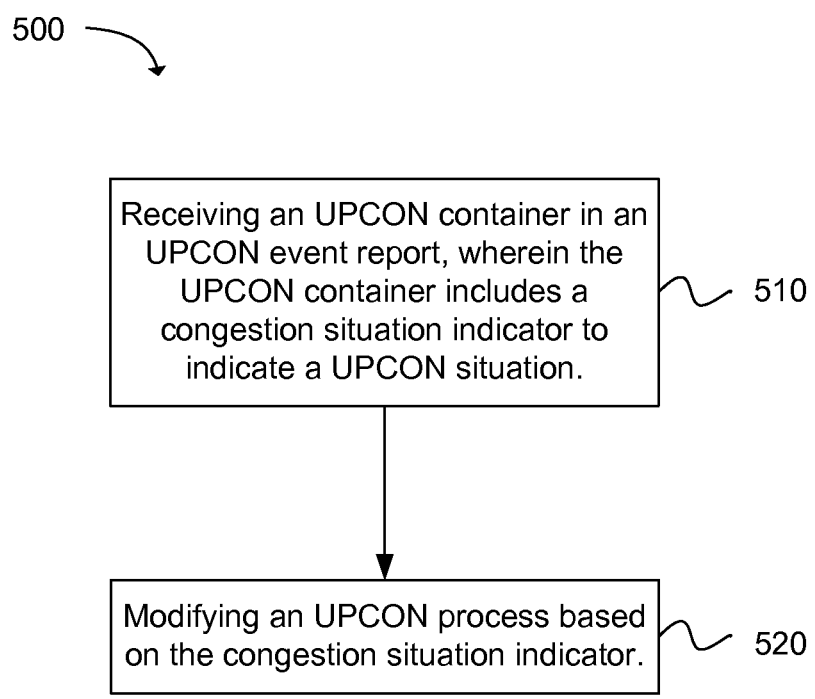
FIG. 10 depicts a flow chart of a method for notifying a core network (CN) of user plane congestion (UPCON) in accordance with an example.

Another example provides a method 500 for notifying a core network (CN) of user plane congestion (UPCON), as shown in the flow chart in FIG. 10. The method may be executed as instructions on a machine or computer circuitry, where the instructions are included on at least one computer readable medium or one non-transitory machine readable storage medium. The method includes the operation of receiving an UPCON container in an UPCON event report, wherein the UPCON container includes a congestion situation indicator to indicate a UPCON situation, as in block 510. The next operation of the method can be modifying an UPCON process based on the congestion situation indicator, as in block 520.

In an example. The UPCON container can include a congestion severity level indicator in a range of values to indicate a congestion severity level. The operation of modifying the UPCON process can further include modifying the UPCON process based on the congestion severity level indicator. In another example, the UPCON container can include a congested interface indicator to indicate a congested radio interface or a congested network interface. The operation of modifying the UPCON process can further include modifying the UPCON process based on the congested interface indicator.

In another configuration, the UPCON container can include a cell identifier (CID) for a cell-based UPCON situation, a UE identity (ID) for a UE-based UPCON situation, an access point name (APN) for a APN-based UPCON situation, a relative ID for a packet data protocol (PDP) context-based UPCON situation or an enhanced presence service (EPS) bearer-based UPCON situation. The operation of modifying the UPCON process can further include modifying the UPCON process based on an ID (e.g., CID, UE ID, or relative ID) or a name (e.g., APN). The core network can include a mobility management entity (MME), a serving gateway (S-GW), a packet data network (PDN) gateway (P-GW), a policy and charging enforcement function (PCEF), a policy and charging rules function (PCRF), a serving general packet radio service (GPRS) support node (SGSN), a gateway GPRS support node (GGSN), an access network discovery and selection function (ANDSF), an operation and maintenance (O&M) subsystem, an UPCON server, a proxy, or a standalone function entity.

In another example, the operation of modifying the UPCON process can further include: initiating an Internet protocol (IP) connectivity access network UP-CAN) session modification procedure to implement new policy and charging control (PCC) rules when the CN includes a policy and charging rules function (PCRF), triggering a user equipment (UE) or an application server (AS) to enable a related provisioned rule or initiating the related rule provision or modification procedure to the UE or the AS when the CN includes an access network discovery and selection function (ANDSF), an operation and maintenance (O&M) subsystem, or an UPCON server, triggering the IP-CAN session modification procedure to accommodate a changed UPCON condition when the CN includes a mobility management entity (MME); triggering a packet data protocol (PDP) context or the IP-CAN session modification procedure to accommodate the changed UPCON condition when the CN includes a serving general packet radio service (GPRS) support node (SGSN); triggering the PDP context modification procedure to accommodate the changed UPCON condition when the CN includes a gateway GPRS support node (GGSN); triggering the IP-CAN session modification procedure to accommodate the changed UPCON condition when the CN includes a packet data network (PDN) gateway (P-GW), or modifying a quality of service (QoS) mapping on a S1-U interface or triggering the IP-CAN session modification procedure to accommodate the changed UPCON condition when the CN includes a serving gateway (S-GW).

In another configuration, the operation of modifying the UPCON process can further include canceling the UPCON process when the congestion situation indicator indicates the UPCON situation ceases. In another example, the method can further include: acknowledging (ACK) the UPCON event report upon successful receipt of the UPCON event report; or forwarding the UPCON event report to an application server (AS) or another device in the CN.

Figure 11:
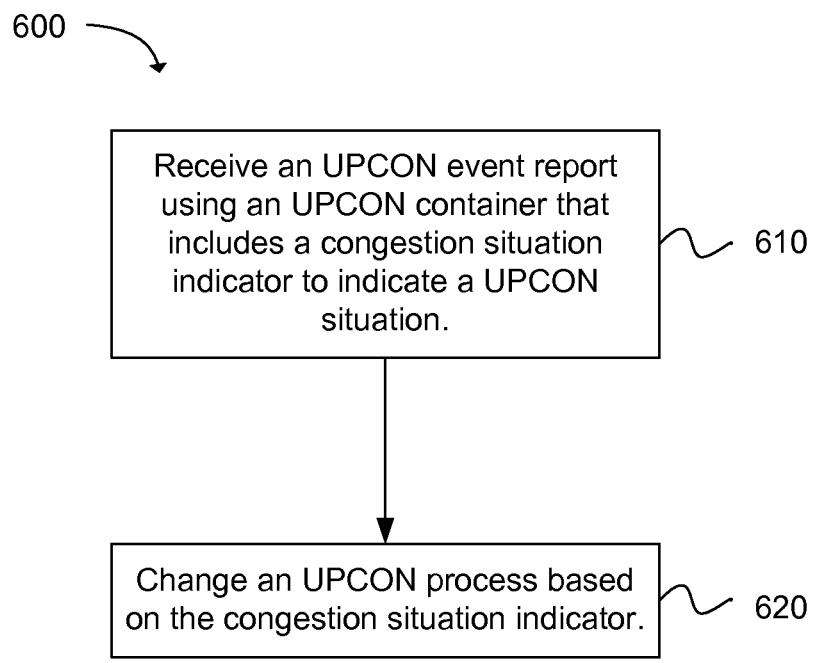
FIG. 11 depicts functionality of computer circuitry of core network (CN) device for reporting radio access network (RAN) user plane congestion (UPCON) in accordance with an example.

Another example provides functionality 600 of computer circuitry of a core network (CN) device for reporting radio access network (RAN) user plane congestion (UPCON), as shown in the flow chart in FIG. 11. The functionality may be implemented as a method or the functionality may be executed as instructions on a machine, where the instructions are included on at least one computer readable medium or one non-transitory machine readable storage medium. The computer circuitry can be configured to receive an UPCON event report using an UPCON container that includes a congestion situation indicator to indicate a UPCON situation, as in block 610. The computer circuitry can be further configured to change an UPCON process based on the congestion situation indicator, as in block 620.

In an example, the UPCON container can be received using a user plane protocol. In another example, the UPCON container can be received using a control plane protocol.

In another configuration, the UPCON container can include a congestion severity level indicator in a range of values to indicate a congestion severity level. The computer circuitry configured to change the UPCON process can be further configured to modify the UPCON process based on the congestion severity level indicator. In another example, the UPCON container includes a congested interface indicator to indicate a congested radio interface or a congested network interface. The computer circuitry configured to change the UPCON process can be further configured to modify the UPCON process based on the congested interface indicator.

In another configuration, the UPCON container can include a cell identifier (CID) for a cell-based UPCON situation, a UE identity (ID) for a UE-based UPCON situation, an access point name (APN) for a APN-based UPCON situation, a relative ID for a packet data protocol (PDP) context-based UPCON situation or an enhanced presence service (EPS) bearer-based UPCON situation. The computer circuitry configured to change the UPCON process can be further configured to modify the UPCON process based on an ID (e.g., CID, UE ID, or relative ID) or a name (e.g., APN). The core network device can include a mobility management entity (MME), a serving gateway (S-GW), a packet data network (PDN) gateway (P-GW), a policy and charging enforcement function (PCEF), a policy and charging rules function (PCRF), a serving general packet radio service (GPRS) support node (SGSN), a gateway GPRS support node (GGSN), an access network discovery and selection function (ANDSF), an operation and maintenance (O&M) subsystem an UPCON server, a proxy, or a standalone function entity.

In another example, the computer circuitry configured to change the UPCON process can be further configured to: initiate an Internet protocol (IP) connectivity access network (IP-CAN) session modification procedure to implement new policy and charging control (PCC) rules when the CN device includes a policy and charging rules function (PCRF); trigger a user equipment (UE) or an application server (AS) to enable a related provisioned rule or initiate the related rule provision or modification procedure to the UE or the AS when the CN device includes an access network discovery and selection function (ANDSF), an operation and maintenance (O&M) subsystem, or an UPCON server, where the UE includes an antenna a touch sensitive display screen, a speaker, a microphone, a graphics processor, an application processor, internal memory, or a non-volatile memory port; trigger the IP-CAN session modification procedure to accommodate a changed UPCON condition when the CN device includes a mobility management entity (MME); trigger a packet data protocol (PDP) context or the IP-CAN session modification procedure to accommodate the changed UPCON condition when the CN device includes a serving general packet radio service (GPRS) support node (SGSN); trigger the PDP context modification procedure to accommodate the changed UPCON condition when the CN device includes a gateway GPRS support node (GGSN); trigger the IP-CAN session modification procedure to accommodate the changed UPCON condition when the CN device includes a packet data, network (PDN) gateway (P-GW); or modify a quality of service (QoS) mapping on a S1-U interface or trigger the IP-CAN session modification procedure to accommodate the changed UPCON condition when the CN device includes a serving gateway (S-GW).

In another configuration the computer circuitry configured to change the UPCON process can be further configured to cancel the UPCON process when the congestion situation indicator indicates the UPCON situation ceases. In another example, the computer circuitry can be further configured to: acknowledge (ACK) the UPCON event report upon successful receipt of the UPCON event report; and forward the UPCON event report to an application server (AS) or other CN device. The UPCON event report can be received from a node, wherein the node includes a base station (BS), a Node B (NB), an evolved Node B (eNB), a baseband unit (BBU), a remote radio head (RRH), a remote radio equipment (RRE), a remote radio unit (RRU), or a central processing module (CPM).

In another example, functionality of computer circuitry of a node can report radio access network (RAN) user plane congestion (UPCON). The functionality may be implemented as a method or the functionality may be executed as instructions on a machine, where the instructions are included on at least one computer readable medium or one non-transitory machine readable storage medium. In another example, the functionality can be provided by a processor and/or a transceiver. The computer circuitry can be configured to determine a RAN UPCON event and generate an UPCON event report using an UPCON container that includes a congestion situation indicator to indicate a UPCON situation. The computer circuitry can be further configured to transmit the UPCON event report to the core network via CN device.

Referring back to FIG. 3-8, an application server (AS) 220 for adapting to user plane congestion (UPCON) can include a transceiver and a processor. The transceiver can be configured to receive an UPCON event report using an UPCON container that includes a congestion situation indicator to indicate a UPCON situation. The processor can be configured to change an UPCON process based on the congestion situation indicator. The change of the UPCON process can trigger the AS to enable a related provisioned rule or initiate the related rule provision or modification procedure via an access network discovery and selection function (ANDSF), an operation and maintenance (O&M) subsystem, or an UPCON server.

In an example, the UPCON container can include a congestion severity level indicator in a range of values to indicate a congestion severity level. The processor configured to change the UPCON process can be further configured to modify the UPCON process based on the congestion severity level indicator. In another example, the UPCON container can include a congested interface indicator to indicate a congested radio interface or a congested network interface. The processor configured to change the UPCON process can be further configured to modify the UPCON process based on the congested interface indicator.

In another configuration, the UPCON container can include a cell identifier (CID) for a cell-based UPCON situation, a UE identity (ID) for a UE-based UPCON situation, an access point name (APN) for a APN-based UPCON situation, a relative ID for a packet data protocol (PDP) context-based UPCON situation or an enhanced presence service (EPS) bearer-based UPCON situation. The process configured to change the UPCON process can be further configured to modify the UPCON process based on an ID (e.g., CID, UE ID, or relative ID) or a name (e.g., APN). In another example, the change of the UPCON process cancels the UPCON process when the congestion situation indicator indicates the UPCON situation is terminated.

Figure 12:
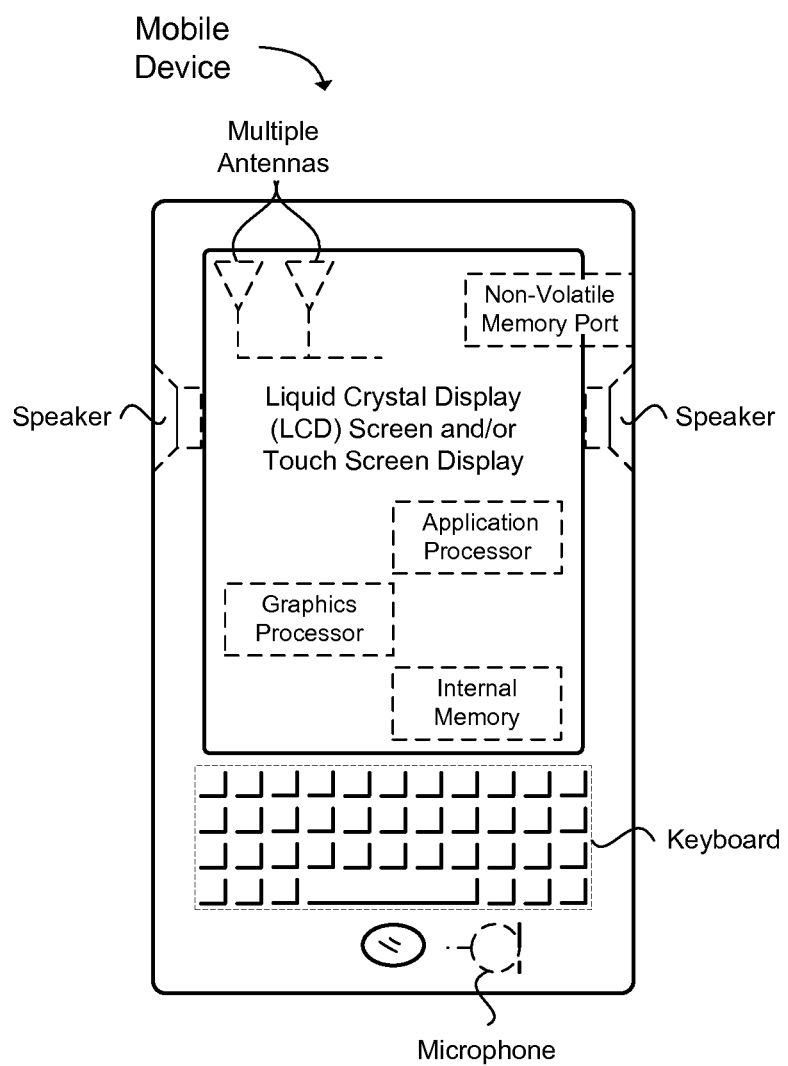
FIG. 12 illustrates a diagram of a wireless device (e.g., UE) in accordance with an example.

FIG. 12 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU) a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 12 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which when joined logically together, comprise the module and achieve the stated purpose for the module.

Indeed, a module of executable code may be a single instruction or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A non-transitory machine readable storage medium having instructions embodied thereon, the instructions which when executed by one or more processors perform the following:
   identifying radio access network (RAN) user plane congestion (UPCON) information (RUCI) at a policy and charging rules function (PCRF) in a core network (CN), wherein the RUCI received at the PCRF includes an access point name (APN) for which the RUCI is reported; and
   performing, at the PCRF, a policy decision to reduce traffic at a RAN node using the RUCI based on a congestion level, an identifier of a user equipment (UE)

impacted by the UPCON, and the access point name (APN) that is included in the RUCI.

2. The non-transitory machine readable storage medium of claim 1, further comprising instructions which when executed by the one or more processors perform the following: receiving the RUCI, at the PCRF, from an operations and maintenance (OAM) system via a functional element.

3. The non-transitory machine readable storage medium of claim 1, wherein the RUCI received at the PCRF includes a congestion level for a particular evolved node B (eNB) or an evolved universal terrestrial radio access network (EUTRAN) cell impacted by the UPCON.

4. The non-transitory machine readable storage medium of claim 1, wherein the RUCI received at the PCRF includes an the identifier for a user equipment (UE) the UE impacted by the UPCON.

5. The non-transitory machine readable storage medium of claim 1, wherein the PCRF that receives the RUCI serves a packet data network (PDN) connection for the UE that is impacted by the UPCON.

6. A policy and charging rules function (PCRF) configured to operate in an evolved packet core (EPC), the PCRF comprising:
at least one processor;
a memory device to store instructions that, when executed by the at least one processor, cause the at least one processor to:
receive radio access network (RAN) user plane congestion (UPCON) information (RUCI) from an operations and maintenance (OAM) system via a functional element, wherein the RUCI received at the PCRF includes an access point name (APN) for which the RUCI is reported; and
perform a policy decision based, in part, based on a congestion level, an identifier of a user equipment (UE) impacted by the UPCON, and the access point name (APN) that is included in the RUCI received at the PCRF in order to reduce traffic at a RAN node.

7. The PCRF of claim 6, wherein the RUCI received at the PCRF includes a congestion level for a particular evolved node B (eNB) or an evolved universal terrestrial radio access network (EUTRAN) cell impacted by the UPCON.

8. The PCRF of claim 6, wherein the RUCI received at the PCRF includes the identifier for the UE impacted by the UPCON.

9. The PCRF of claim 6, wherein the instructions, when executed by the at least one processor, cause the at least one processor to: serve a packet data network (PDN) connection for the UE that is impacted by the UPCON.

10. A method for performing policy decisions based on user plane congestion (UPCON), the method comprising:
receiving radio access network (RAN) user plane congestion (UPCON) information (RUCI) at a policy and charging rules function (PCRF) in a core network (CN), wherein the RUCI received at the PCRF includes an access point name (APN) for which the RUCI is reported; and
performing, at the PCRF, a policy decision for reducing traffic at a RAN node based based a congestion level, an identifier of a user equipment (UE) impacted by the UPCON, and the access point name (APN) that is included in the RUCI received at the PCRF.

11. The method of claim 10, further comprising receiving the RUCI, at the PCRF, from an operations and maintenance (OAM) system via a functional element.

12. The method of claim 10, wherein the RUCI received at the PCRF includes a congestion level for a particular evolved node B (eNB) or an evolved universal terrestrial radio access network (EUTRAN) cell impacted by the UPCON.

13. The method of claim 10, wherein the RUCI received at the PCRF includes the identifier for the UE impacted by the UPCON.

14. The method of claim 10, wherein the PCRF that receives the RUCI serves a packet data network (PDN) connection for the UE that is impacted by the UPCON.

15. An evolved packet core (EPC) comprising:
at least one processor;
a memory device to store instructions that, when executed by the at least one processor, cause the at least one processor to:
identify radio access network (RAN) user plane congestion (UPCON) information (RUCI), the RUCI including a congestion level for a particular evolved node B (eNB) or an evolved universal terrestrial radio access network (EUTRAN) cell impacted by the UPCON, an identifier for a user equipment (UE) impacted by the UPCON, and an access point name (APN) for which the RUCI is reported; and
perform a policy decision in order to reduce traffic at a RAN node, the policy decision being performed based on the congestion level, the identifier of the UE impacted by the UPCON, and the APN including in the RUCI.

16. The EPC of claim 15, wherein the instructions, when executed by the at least one processor, cause the at least one processor to: receive the RUCI from an operations and maintenance (OAM) system via a functional element.

* * * * *